(12) United States Patent
Rispal et al.

(10) Patent No.: US 9,775,363 B2
(45) Date of Patent: Oct. 3, 2017

(54) PROCESS FOR THE CONTINUOUS PRODUCTION OF PASTEURIZED DRIED MINCED MEAT, RECONSTITUTED IN THE FORM OF THIN SLABS, AND UNIT FOR CARRYING OUT SAID PROCESS

(71) Applicant: ADIV DEVELOPPEMENT, Clermont Ferrand (FR)

(72) Inventors: Olivier Rispal, Orcet (FR); Alain Peyron, Chamalieres (FR)

(73) Assignee: ADIV DEVELOPPEMENT, Clermont-Ferrand (FR)

( * ) Notice: Subject to any disclaimer, the term of this patent is extended or adjusted under 35 U.S.C. 154(b) by 161 days.

(21) Appl. No.: 14/408,924

(22) PCT Filed: Jun. 17, 2013

(86) PCT No.: PCT/FR2013/051415
§ 371 (c)(1),
(2) Date: Dec. 17, 2014

(87) PCT Pub. No.: WO2013/190229
PCT Pub. Date: Dec. 27, 2013

(65) Prior Publication Data
US 2015/0140188 A1    May 21, 2015

(30) Foreign Application Priority Data

Jun. 18, 2012 (FR) ...................... 12 55674

(51) Int. Cl.
*A23B 4/023* (2006.01)
*A23B 4/26* (2006.01)
(Continued)

(52) U.S. Cl.
CPC ................ *A23B 4/023* (2013.01); *A22C 7/00* (2013.01); *A22C 7/0076* (2013.01);
(Continued)

(58) Field of Classification Search
CPC ....... A22C 7/0076; A22C 7/00; A23B 4/0053; A23B 4/26; A23B 4/023; A23L 13/67; A23V 2002/00
(Continued)

(56) References Cited

U.S. PATENT DOCUMENTS 2,237,442 A * 4/1941 MacFarlane ............. A23N 5/01
209/173
2,507,486 A * 5/1950 Weissenbach ......... A23B 4/044
426/315

(Continued)

FOREIGN PATENT DOCUMENTS

| EP | 0 074 185 A2 | 3/1983 |
| FR | 2 607 673 A1 | 6/1988 |
| FR | 2 827 122 A1 | 1/2003 |

*Primary Examiner* — Eric Stapleton
(74) *Attorney, Agent, or Firm* — Seed IP Law Group LLP

(57) ABSTRACT

A process for manufacturing minced meat includes
  ensuring the continuous shaping of the said minced meat into the form of a flattened strip;
  placing the flattened strip of meat between two sheets of controlled permeability film;
  evening out the thickness and spreading the minced meat placed between the two sheets;
  continuously unrolling the meat strip in a bath of a dehydration-salting solution;
  continuously unrolling the meat strip in a bath of a pasteurization solution;
  continuously unrolling the meat strip in a rinsing tank;
  removing the sheets after removal from the rinsing tank; and
  transporting the meat strip to an output conveyor.

8 Claims, 2 Drawing Sheets

(51) Int. Cl.
   *A23L 1/317* (2006.01)
   *A22C 7/00* (2006.01)
   *A23B 4/005* (2006.01)
   *A23L 13/60* (2016.01)

(52) U.S. Cl.
   CPC .............. *A23B 4/0053* (2013.01); *A23B 4/26* (2013.01); *A23L 13/67* (2016.08); *A23V 2002/00* (2013.01)

(58) Field of Classification Search
   USPC .......................... 429/455; 99/535; 426/455
   See application file for complete search history.

(56) References Cited

U.S. PATENT DOCUMENTS

| | | | | | |
|---|---|---|---|---|---|
| 2,786,764 | A * | 3/1957 | Rivoche | ............... | A23B 4/10 426/302 |
| 3,011,895 | A * | 12/1961 | Toepper | ............... | A22C 7/00 426/413 |
| 3,041,185 | A * | 6/1962 | Martin | ............... | B65B 55/18 426/232 |
| 3,101,752 | A * | 8/1963 | Martin | ............... | B65B 55/027 137/625.23 |
| 3,138,178 | A * | 6/1964 | Martin | ............... | B65B 55/14 141/146 |
| 3,198,639 | A * | 8/1965 | Webster | ............... | A23B 7/00 426/397 |
| 3,203,034 | A * | 8/1965 | Matzer | ............... | A22C 29/043 452/14 |
| 3,298,404 | A * | 1/1967 | Eisenberg | ............... | B65B 1/22 141/1 |
| 3,395,549 | A * | 8/1968 | Grimes | ............... | A23B 4/062 426/524 |
| 3,542,570 | A * | 11/1970 | Bush | ............... | A23G 9/28 426/413 |
| 3,562,855 | A * | 2/1971 | Wills | ............... | A22C 29/046 452/14 |
| 3,582,349 | A * | 6/1971 | Rasmussoin | ............... | A23G 1/20 426/274 |
| 3,619,855 | A * | 11/1971 | Willis | ............... | A22C 29/043 452/14 |
| 3,642,496 | A * | 2/1972 | Gibson | ............... | A23L 13/426 426/513 |
| 3,863,020 | A * | 1/1975 | Robinson | ............... | A22C 7/0046 426/393 |
| 3,910,174 | A * | 10/1975 | Nelles | ............... | A01J 25/167 426/582 |
| 3,971,851 | A * | 7/1976 | Otto | ............... | A23L 13/20 426/510 |
| 3,983,259 | A * | 9/1976 | Maior | ............... | A23B 7/06 210/774 |
| 4,015,021 | A * | 3/1977 | Harima | ............... | B65D 75/46 426/130 |
| 4,138,768 | A * | 2/1979 | Roth | ............... | A22C 7/0076 425/307 |
| 4,163,804 | A * | 8/1979 | Meyer | ............... | A23K 40/20 426/315 |
| 4,192,899 | A * | 3/1980 | Roth | ............... | A22C 7/00 426/143 |
| 4,349,575 | A * | 9/1982 | Roth | ............... | A23B 4/064 426/513 |
| 4,446,159 | A * | 5/1984 | Roth | ............... | A23B 4/064 426/249 |
| 4,448,793 | A * | 5/1984 | Akesson | ............... | A22C 11/001 426/241 |
| 4,559,236 | A * | 12/1985 | Okada | ............... | A23L 17/70 426/513 |
| 4,680,183 | A * | 7/1987 | van Schouwenburg | ....... | A23L 13/67 426/272 |
| 4,700,547 | A * | 10/1987 | Hayashi | ............... | A23B 4/08 62/373 |
| 4,761,128 | A * | 8/1988 | Fowler | ............... | A23G 9/26 425/126.2 |
| 4,781,557 | A * | 11/1988 | Rubio | ............... | A23P 30/10 425/147 |
| 4,792,457 | A * | 12/1988 | Brna | ............... | B65B 9/12 426/129 |
| 4,815,368 | A * | 3/1989 | Nelles | ............... | A01J 25/167 99/452 |
| 4,887,333 | A * | 12/1989 | Gallant | ............... | A01K 80/00 126/369.2 |
| 4,897,896 | A * | 2/1990 | Gallant | ............... | A01K 80/00 126/369.2 |
| 4,901,401 | A * | 2/1990 | Gallant | ............... | A01K 80/00 452/12 |
| 4,905,587 | A * | 3/1990 | Smithers | ............... | A22C 11/029 425/133.1 |
| 4,916,775 | A * | 4/1990 | Gallant | ............... | A01K 80/00 452/14 |
| 4,975,291 | A * | 12/1990 | Petrosillo | ............... | A23L 13/67 426/129 |
| 5,037,350 | A * | 8/1991 | Richardson | ............... | A22C 7/00 426/518 |
| 5,042,187 | A * | 8/1991 | Bentzley | ............... | A01K 80/00 43/6.5 |
| 5,132,137 | A * | 7/1992 | Reimann | ............... | A23L 13/67 426/513 |
| 5,192,566 | A * | 3/1993 | Cox | ............... | A23L 15/35 426/104 |
| 5,347,792 | A * | 9/1994 | Meli | ............... | B29C 65/18 426/130 |
| 5,701,724 | A * | 12/1997 | Meli | ............... | B65B 9/12 426/130 |
| 5,811,146 | A * | 9/1998 | Marra | ............... | A23L 13/67 426/513 |
| 5,843,500 | A * | 12/1998 | Guarino | ............... | A23B 4/064 426/124 |
| 5,843,504 | A * | 12/1998 | Kobussen | ............... | A22C 11/008 198/493 |
| 6,120,809 | A * | 9/2000 | Rhodes | ............... | A23C 19/053 426/334 |
| 6,190,718 | B1 * | 2/2001 | Eek | ............... | A23B 7/045 426/399 |
| 6,254,911 | B1 * | 7/2001 | Komatsu | ............... | A23B 4/064 426/129 |
| 7,090,881 | B2 * | 8/2006 | Sirami | ............... | A22C 5/00 426/264 |
| 7,404,710 | B2 * | 7/2008 | Le Paih | ............... | A22C 11/00 425/133.1 |
| 7,677,880 | B2 * | 3/2010 | Moore | ............... | A22C 7/0084 425/324.1 |
| 7,900,471 | B2 * | 3/2011 | Leske | ............... | F25C 5/00 62/389 |
| 8,029,840 | B2 * | 10/2011 | Le Paih | ............... | A22C 11/00 426/105 |
| 8,484,937 | B1 * | 7/2013 | Gabriel | ............... | B65B 7/04 53/463 |
| 8,613,615 | B2 * | 12/2013 | Lindee | ............... | A22C 7/0084 425/556 |
| 8,801,427 | B2 * | 8/2014 | Lindee | ............... | A22C 7/0084 425/449 |
| 9,090,368 | B2 * | 7/2015 | Cao | ............... | B65B 61/28 |
| 9,095,171 | B2 * | 8/2015 | Lindee | ............... | A22C 7/0084 |
| 9,113,638 | B2 * | 8/2015 | Lindee | ............... | A22C 7/0084 |
| 2002/0012726 | A1 * | 1/2002 | Anders | ............... | A22C 7/0023 426/281 |
| 2006/0127551 | A1 * | 6/2006 | Lewis | ............... | A23B 7/153 426/506 |
| 2007/0048403 | A1 * | 3/2007 | Thuli | ............... | A01J 25/00 426/36 |

* cited by examiner

PROCESS FOR THE CONTINUOUS PRODUCTION OF PASTEURIZED DRIED MINCED MEAT, RECONSTITUTED IN THE FORM OF THIN SLABS, AND UNIT FOR CARRYING OUT SAID PROCESS

BACKGROUND

Technical Field

This invention pertains to the technical sector of the meat transformation and packaging industry, and especially pertains to a process for continuous manufacturing of pasteurized and dried minced meat, reconstituted into thin slabs. The invention also pertains to a unit used to implement the said process.

Description of the Related Art

According to the prior art, a process was devised to allow the minced meat to be packaged in fine portions that could then be presented in containers for their marketing.

The state of the art process, especially evident in the French patent application no. FR 2 827 122, is particularly remarkable in that it implements the following phases for minced meat, for continuously obtaining salted and dried minced meat, reconstituted into thin slabs.

The first phase consists of finely mincing more or less choice cuts of meat in a grinder-mixer.

After the grinder-mixer has finished its operation, the second phase consists of transporting the minced meat in a meat pump, which will shape it into a continuous tube or a continuous flattened strip.

The third phase consists of unwinding a film in one or more parts, which will constitute a sealed sheath around the continuous tube or strip of minced meat.

The fourth phase consists of passing the said sheathed tube or strip of minced meat through a rolling device, which will allow the minced meat to be spread in the shape of a strip, in a thin layer, in a compact state and with a texture that does not show distinct parts of the meat itself.

The fifth phase consists of continuously unrolling the stretched minced meat strip in a bath of a dehydration-salting solution.

The sixth phase, after being removed from the solution bath, consists of removing the film that comprises the sheath.

The seventh phase consists of transporting the thin strip of rolled and dried minced meat to a cutting and packaging station.

This process has several advantages, both in terms of productivity as well as presentation of the product. However, the microbiological stabilization of the dried meat obtained from this process is still tricky to obtain and can be improved further. Moreover, the phase of the process that, after removal from the solution bath, consists of removing the film that comprises the sheath has a few drawbacks in that the sheath sticks to the meat, which is a significant hindrance.

BRIEF SUMMARY

The purpose of the invention is to solve the aforementioned drawbacks by suggesting a continuous manufacturing process of seasoned and dried minced meat, reconstituted into thin slabs, the output of which is pasteurized and dried meat that has an increased microbiological stability.

Another objective is to propose a process that comprises a step aiming to facilitate the step of removing the film that makes up the sheath around the dried minced meat.

The invention also aims at providing a unit for implementing the process, with a simple, secure and rational design.

To achieve these objectives, a process has been devised for the manufacturing and transformation of minced meat.

According to the invention, the process implements phases to minced meat, for continuously obtaining salted and dried minced meat reconstituted into thin slabs, which consist of:

ensuring the continuous shaping of the said minced meat into the form of a tube or a continuous flattened strip;

placing the continuous flattened strip or tube of meat between two sheets of controlled permeability film;

evening out the thickness and spreading the minced meat placed between the two sheets of film, in the shape of a strip, in a thin layer, in a compact state and with a texture that does not show distinct parts of the meat itself;

continuously unrolling the stretched minced meat strip in a bath of a dehydration-salting solution;

continuously unrolling the stretched and dried minced meat strip in a bath of a pasteurization solution;

continuously unrolling the stretched, dried and pasteurized minced meat strip in a rinsing tank;

removing the paper sheets after removal from the rinsing tank;

transporting the thin strip of rolled, dried, pasteurized and rinsed minced meat to an output conveyor.

In this manner, the aforementioned process allows continuously drying and pasteurizing meat that has or has not been minced, salted and spiced beforehand. The obtained meat is thus stable from a microbiological point of view.

Moreover, the step consisting of continuously unrolling the stretched, dried and pasteurized minced meat strip in a rinsing tank facilitates the step consisting of removing the sheets of controlled permeability film. Normally, when the meat is dried, the film sticks to it. The rinsing helps in removing the film more easily and also rinses out the residual brine, which can then be recycled.

According to a special implementation of the process according to the invention, this includes, after the step consisting of evening out the thickness and spreading the minced meat placed between two sheets of paper, steps consisting of crushing the edges of the meat strip in order to completely isolate the meat from the dehydration and pasteurization solutions, and of adjusting the excessive thickness of the meat caused by the crushing.

The process comprises, after the steps of crushing and adjusting the excessive thickness, a step consisting of folding the crushed borders over the meat strip.

The process comprises, after the step of transporting the thin strip of meat to the output conveyor, a step consisting of applying a dividing plastic film on the said meat strip and rolling it on itself.

This step allows storing the meat in the form of rolls, and the implementation of the plastic film facilitates the step of unrolling the said roll, as the meat does not stick to the plastic surface.

In another form of execution, the process comprises, after the step of transporting the thin strip of meat to the output conveyor, a step consisting of continuously cutting the said meat strip, in order to directly prepare the said portions of cut meat for being placed in containers.

To achieve these aforementioned objectives, a unit has also been devised for the manufacturing and transformation of minced meat from pre-minced meat, for continuously obtaining salted, dried and pasteurized minced meat reconstituted into thin slabs.

According to the invention, the unit comprises:

a feed hopper, receiving the output of a meat pump connected to an extrusion nozzle for shaping the minced meat into the form of a continuous flattened strip or tube;

a conveyor meant to catch the meat strip on its exit from the extrusion nozzle;

a first system for distributing and arranging the first sheet of controlled permeability film under the meat strip and on the conveyor;

a second system for distributing and arranging the second sheet of controlled permeability film on the meat strip;

a first rolling device located downstream of the said systems for distributing and arranging the paper sheets;

a bath of a dehydration-salting solution that contains a mechanical conveyance device for transporting the stretched minced meat strip;

a bath of a pasteurization solution that contains a mechanical conveyance device for transporting the stretched and dried minced meat strip;

a rinsing tank that contains a mechanical conveyance device for transporting the stretched, dried and pasteurized minced meat strip;

a device for separating the sheets of film from the dried and pasteurized meat strip, located downstream from the rinsing tank;

an output conveyor.

In this manner, minced meat is continuously supplied by the meat pump to the extrusion nozzle. This nozzle enables slabs of meat to be formed continuously in thin layers. This slab of meat is then placed between two sheets of controlled permeability film in order to form a strip of meat. This meat strip is then dipped into a dehydration-salting solution bath to dry it. The drying duration is variable and depends on the desired degree of dryness of the finished product. After being dried, the meat strip is dipped into a heated pasteurization solution bath so that it can continuously be flash pasteurized. The expression "flash pasteurization", according to professional terminology, means pasteurization during which the rise and fall in temperature is very rapid. The meat strip is then rinsed in water and transported to a mat where the controlled permeability film is removed.

According to a special execution form, the unit includes, downstream, a rolling device, two knurls for crushing the edges of the meat strip, and a second rolling device.

In this manner, the edges of the meat strip are crushed by the crushing knurls in order to completely isolate the meat from the dehydration and pasteurization solutions, and the excessive thickness of the meat caused by the crushing is adjusted by the second rolling device.

The unit also comprises, downstream of the second rolling device, means to fold the crushed edges of the meat strip onto the said meat strip.

According to a form of execution of the unit, it comprises, downstream of the output conveyor, a system for distributing and arranging a plastic film on the meat strip and means to roll the meat strip on itself.

According to another form of execution, the unit comprises, downstream of the output conveyor, a device for cutting and packaging the dried and pasteurized minced meat into fine portions.

Then, the meat strip, after being rinsed and stripped of its controlled permeability film, and thus dried and pasteurized, can be rolled on itself to form a roll or continuously cut in order to be packaged.

The vacuum-packaged, dried and pasteurized meat can then be processed under high pressure to microbiologically stabilize the finished product in its final packaging.

Preferably, in the unit according to the invention, the dehydration-salting solution bath is a brine bath with a temperature of less than 60° C.

Preferably, the pasteurization solution bath is a brine bath with a temperature of more than 60° C.

Preferably, the dehydration and pasteurization brine solutions have a pH of less than 7, which helps in lowering the pH of the meat and stabilizing it microbiologically. Since the brine is acidic, bacteria do not grow in it and therefore the brine is also microbiologically stabilized.

BRIEF DESCRIPTION OF THE SEVERAL VIEWS OF THE DRAWINGS

The invention shall be properly understood, and other characteristics and advantages of the invention will come to light from the description given below, for information purposes only and in no way exhaustive, with reference to the diagrams in the annex, in which.

DETAILED DESCRIPTION

Figure 2:
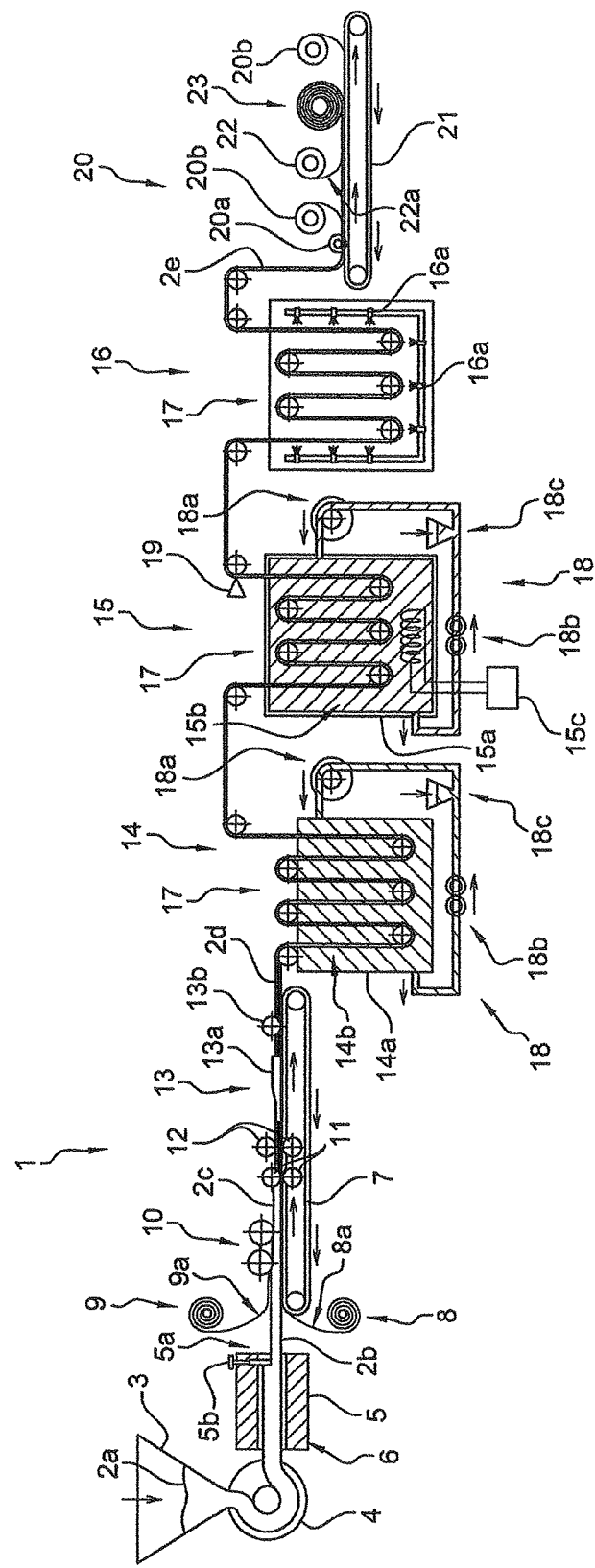
FIG. 2 is a schematic view illustrating the unit used to implement the process according to the invention.

The unit (1) allowing the continuous manufacturing of salted and dried minced meat, reconstituted into thin slabs, comprises, from start to finish, the following different means shown in FIG. 2.

The minced and processed meat is referenced in its entirety (2), and sub-references will be used according to the different phases of processing and implementation of the process, while referring to its form.

The unit (1) comprises a feed hopper (3) that receives the minced meat (2a), from more or less choice cuts, in its raw state. The hopper (3) may either receive only raw minced meat or it may also receive additional foodstuffs such as spices and other ingredients that may give additional nutritive or sensory qualities to the final product.

The said feed hopper (3) has a meat pump (4) at its outlet, which is connected to an extrusion nozzle (5). The meat pump (4) allows continuously supplying the extrusion nozzle (5) with minced meat (2a).

The feed hopper (5) shapes the minced meat into the form of a tube or a continuous flattened strip (2b), for the purpose of continuous transport. The minced meat is therefore in the form of a tube or is flattened during a manufacturing phase.

In one particular form of execution of the invention, the thickness of the meat is adjusted by adjusting the end of the nozzle (5), and especially the size of its opening (5a). To be more precise, a series of screws (5b) allows re-tightening the said end and varying the opening of the said nozzle (5) to obtain thicker or thinner slabs of meat (2b). The wall of the extrusion nozzle (5) is preferably double-walled so that heating devices (6) can be placed in the space between the two walls to lightly heat the meat circulating in the extrusion nozzle (5). This especially helps in preventing certain fatty material in the meat from being deposited on the walls of the extrusion nozzle (5).

Downstream, there is a conveyor (7) meant to catch the meat strip (2b) as it exits from the extrusion nozzle (5).

The unit (1) also comprises a first system for distributing and arranging (8) the first sheet of controlled permeability film (8a) under the meat strip (2b) and on the conveyor (7);

This first system (8) is usefully in the form of a first roll of controlled permeability film, located roughly under the conveyor (7), at the level of its end and meant to unroll the first sheet of film (8a), which will be placed on the said conveyor (7). The first roll of film (8) is supported on its ends by supports placed on both sides of the said conveyor (7), such that it can pivot to authorize the unrolling of the said first sheet of film (8a). The first sheet of film (8a) thus roughly covers the surface of the conveyor (7), and the meat strip (2a) caught by the said conveyor (7) finds itself placed on the said first sheet of controlled permeability film (8a).

The unit (1) comprises a second system for distributing and arranging (9) a second sheet of controlled permeability film (9a) on the meat strip (2b); This second system (9) is in the form of a second roll of film, similar to the first, located roughly above the conveyor (7), at the level of its end and meant to unroll the second sheet of film (9a), which will be placed on the meat strip (2b). The second roll of film is supported on its ends by supports placed on both sides of the said conveyor (7), such that it can pivot to authorize the unrolling of the said second sheet of controlled permeability film (9a).

A mechanical system has been provided, which unrolls the first (8a) and second (9a) sheets of film at a set speed, depending on the conditions of processing of the meat.

The tube or strip (2a) of minced meat, covered and protected by the said sheets of controlled permeability film (8a, 9a), is then transported to a rolling device (10), which can be horizontal or vertical, comprising several pairs of nip rolls that allow progressively crushing the minced meat and stretching it into a thin layer. As a result, after the rolling, the minced meat, wrapped in sheets of controlled permeability film (8a, 9a), in a flattened state (2c) is formed into a continuous thin and compact strip, without any granules of minced meat, thus having the appearance of a continuous and firm texture.

Downstream of the rolling, the unit (1) comprises, in a special form of execution, two knurls for crushing (11) the edges of the meat strip, and a second rolling device (12). The knurls (11) are arranged on both sides of the meat strip (2c), on its edges. The rotation of the knurls (11) is mechanized. They are help up by supports and are in contact with the conveyor (7) so that they can crush the edges of the meat strip (2c) when the latter pass between the conveyor (7) and the said knurls (11). The crushing of the meat strip (2c) especially seals the first (8a) and second (9a) sheets of film and isolates the meat inside the said sheets so that it can subsequently be immersed in the dehydration and pasteurization solution baths.

The second rolling device (12) is similar to the first rolling device (10). For this purpose, it is in the form of a roller that crushes the meat strip (2c) in order to readjust the excessive thickness of the meat caused by crushing the edges.

Downstream of the second rolling device (12), the unit (1) comprises means (13) to fold the crushed edges of the meat strip (2c) onto the said meat strip. These means (13) are in the form of two folded lateral parts (13a) of the conveyor, each followed by a knurl (13b) that presses the folded edge. The edges, due to the forward movement of the meat strip (2c) on the conveyor (7), are folded when they meet the said lateral parts (13a). This especially allows an optimal isolation of the meat with respect to its immersion in the baths of the dehydration and pasteurization solutions.

The continuous stretched and rolled strip of minced meat (2d) is then successively immersed in a dehydration-salting solution bath (14), a pasteurization brine bath (15) and a rinsing tank (16).

For this purpose, each bath (14, 15) as well as the tank (16) includes a continuous conveyance device (17) with rollers, which transports the meat strip (2d) through the bath (14, 15) or the tank (16) for a given period of time. The length of the baths (14, 15) or the tank (16) is determined by the immersion time required for first—the dehydration-salting of the meat, second—the pasteurization, and third—the rinsing.

The baths containing the dehydration-salting (14) and pasteurization (15) solutions are equipped with a circuit (18) for recycling and reinserting the solution. For this purpose, the circuit (18) includes a reinsertion pump (18a) as well as sensors (18b) for controlling the pH and the solute concentrations of the dehydration bath. A device (18c) for concentration by evaporation and for dosage, integrated in the said circuit, allows readjusting the pH, the concentration and the composition of the solution.

The conveyance devices (17) can wholly or partially be submerged in the baths of the dehydration-salting (14) and pasteurization (15) solutions, and in the rinsing tank (16).

The dehydration-salting solution bath (14) is in the form of a tank (14a) containing a dehydrating brine solution (14b), preferably acidic in nature. The pH of the dehydrating brine is especially less than 7 and its temperature is less than 60° C. The dehydration-salting brine bath (14) helps in drying the meat strip (2d). Under the effect of the osmotic pressure generated by the dehydrating brine (14b), the water in the meat is removed through the controlled permeability film (8a, 9a). The duration of drying of the meat depends on the duration of contact with the dehydrating brine (14b). The acidic pH of the dehydrating brine also helps in reducing the pH of the meat during its drying, which in turn increases its microbiological stability.

The pasteurization solution bath (15) is in the form of a tank (15a) containing a pasteurizing brine solution (15b), preferably acidic in nature. The temperature of the pasteurizing brine (15b) is greater than 60° C. and the pH is also less than 7. The pasteurizing brine bath (15) helps in maintaining the pasteurizing brine (15b) at a relatively high temperature in order to continuously flash pasteurize the meat. The pasteurizing brine solution (15b) is therefore heated by a heat exchanger (15c), for example. Preferably, the wall of the pasteurization tank (15a) is insulated, in order to limit heat loss as much as possible.

A means for scraping (19), such as a scraper, is usefully equipped at the outlet of the drying (14a) and pasteurization (15a) tanks, in order to scrape the surface of the meat strip and thus scrape off the residual brine on the second sheet of film (9a) and allow the said brine to fall back into the said pasteurization tank (15a), in order to best prepare the meat for the rinsing step.

The pasteurization of the dried meat helps in reducing the microbial flora in the said meat, which greatly contributes to improving its microbiological stability.

The rinsing tank (16) is in the form of a tank fitted with a number of nozzles (16a) for spraying the rinsing solution, e.g., water. These are meant to spray water on the meat strip in order to rinse it and optimize the process of separating the meat from the controlled permeability film (8a, 9a).

As regards the first (8a) and second (9a) sheets of film surrounding the rolled and minced meat, they are selected such that they meet different criteria, taking into account the conditions of the process of the invention.

These sheets (8a, 9a) of controlled permeability film must first be such that they do not deteriorate during the time for which they are steeped in the dehydration-salting (14) and pasteurization (15) solution baths. They must have a controlled permeability and must also, by conduction, allow the desired effect of pasteurization of the meat, for the entirety of its volume and thickness, and more generally must conduct the properties that are given to it by the solution. In addition, these sheets (8a, 9a) must have a certain level of maintainability during the passage through the conveyance device (17) that is between the baths of the dehydration-salting (14) and pasteurization (15) solutions, and the rinsing tank (16), and especially during the passage around the different return rollers.

In practice, the applicant has selected a controlled permeability film (8a, 9a) that optimally complies with all these constraints. It may also be made of any material that allows the distribution of water, such as animal fibers (collagen), cellulose, polyethersulfone, etc.

Once removed from the rinsing tank (16), the stretched, dried and pasteurized minced meat strip (2e) is continuously transported to a device (20) that separates the sheets (8a, 9a) of film from meat strip (2e) and towards an output conveyor (21).

The output conveyor (21) is capable of carrying the meat strip (2e) as it exits from the rinsing tank (16) and transporting it towards the packaging or cutting stations.

The device (20) that separates the sheets (8a, 9a) of film from the meat strip (2e) is, in the preferred form of execution, in the form of two opening devices (20a), such as freely rotating circular brushes, located at the level of the edges of the meat strip (2e), which are capable of unfolding the folded edges along the length of the said meat strip. The device also comprises freely rotating assembled sheaths (20b) that are meant to recover the said controlled permeability film (8a, 9a) by rolling them around the said sheaths.

The unit (1), and more specifically the output conveyor (21), also comprises, in the preferred form of execution, a system for distributing and arranging (22) a dividing plastic film (22a) on the meat strip that has been stripped of its film, and means (23) for rolling the meat strip on itself. The distributing and arranging system (22) is in the form of a roll of plastic film, equipped at the level of the output conveyor (21), supported from its ends and freely rotating so as to be able to place a strip of plastic film (22a) on the meat strip. The means (23) that help in rolling the meat strip on itself are themselves in the form of an assembled sheath, equipped at the level of the output conveyor (21), supported from its ends and freely rotating so as to be able to roll the meat strip on the said sheath.

In another form of execution, the unit (1), and more specifically the output conveyor (21), comprises a station for cutting and packaging, consisting of cutting the said meat strip, stripped of its controlled permeability film, into portions.

Thus, the said portions are thin and are obtained in the cuts corresponding to the desired forms to be obtained.

Figure 1:
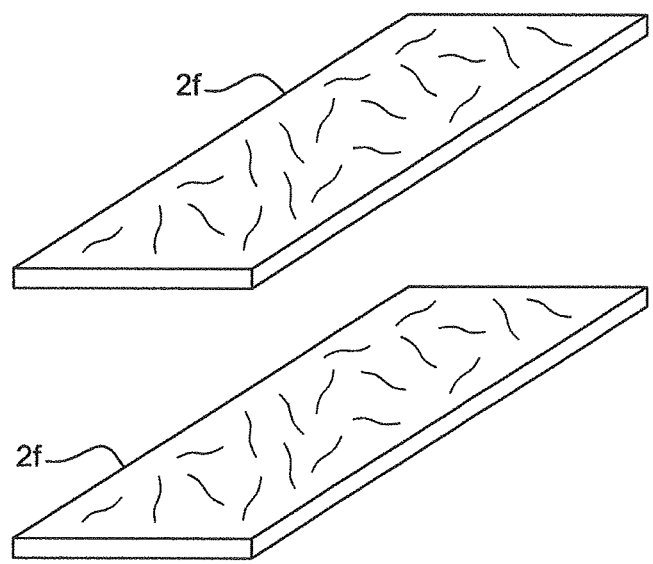
FIG. 1 is a view of a strip of dried and pasteurized minced meat, reconstituted into a thin slab, which was obtained from the process according to the invention.

FIG. 1 shows several portions of minced meat (20 that is reconstituted in a form that is completely different from the original. Thus, according to the invention, the portions of minced meat have a compact texture and it is no longer possible to visually identify the original configuration.

This new process for transforming minced meat into thin slabs has numerous and significant advantages.

Most importantly, it allows the use of varied raw materials, that are more or less choice cuts, depending on the desired end result, and allows creating value for trimmings and tough muscles.

In addition, it helps in obtaining a continuous dried and pasteurized strip of meat that has an optimal microbiological stability.

The process and unit (1) also allows rinsing and recycling the brine.

It also allows obtaining a soft and regular product that is highly standardized in appearance, form, taste, texture. It allows integrating ingredients that disseminate their characteristics throughout the thus processed meat during the processing.

The process can easily be integrated into industry and enables a continuous and rapid processing of this minced meat, with a transformation time of only a few hours (mostly between two to five hours). Very little labor is required.

Another advantage is that the sheets (8a, 9a) of film have three functions, namely the function of protection of the meat, the function of interfacing with the solution while allowing the properties of the solution to reach into the meat and the function of transportation throughout the process.

The form of the thus obtained portions of minced meat may vary, depending on the cutting tool, and can thus adapt to any possible packaging.

In addition to the classic rectangular forms, the cutting tool can create more complex forms such as, for example, rings, triangles, etc. that can grant an innovative appearance to the marketing. The meat strip can also be rolled on itself to form tubes or other shapes.

The ingredients, herbs and spices can be adapted according to the production lines, for variable and desired quantities.

Without going beyond the scope of the invention, the process applies to all meat-based ingredients.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A unit for the manufacturing and transformation of minced meat comprising:
   a meat pump connected to an extrusion nozzle for shaping the minced meat into a form of a tube or a continuous flattened strip;
   a conveyor system meant to catch a meat strip as it exits from the extrusion nozzle;
   a first system for distributing and arranging a first sheet of controlled permeability film under the meat strip and on the conveyor;
   a second system for distributing and arranging a second sheet of controlled permeability film on the meat strip;
   a first rolling device located downstream of the said systems for distributing and arranging the sheets of film;
   a bath of a dehydration-salting solution that contains a first portion of the conveyor system for continuously transporting the meat strip through the bath of the dehydration-salting solution;
   a bath of a pasteurization solution that contains a second portion of the conveyor system for continuously transporting the meat strip from the bath of the dehydration-salting solution and then through the bath of the pasteurization solution;
   a rinsing tank that contains a third portion of the conveyor system for continuously transporting the meat strip from the bath of the pasteurization solution and then through the rinsing tank; and a device for separating the sheets of controlled permeability film from the meat strip, located downstream from the rinsing tank;

the first, second, and third portions of the conveyor system forming a continuous conveyance device that continuously transports a single, continuous meat strip through the bath of the dehydration-salting solution, then through the bath of the pasteurization solution, and then through the rinsing tank.

2. The unit according to claim 1, further comprising two knurls for crushing the edges of the meat strip, a second rolling device, and two folded lateral parts of the conveyor to fold the crushed edges of the meat strip onto the said meat strip.

3. The unit according to claim 1, further comprising a station for cutting and packaging the meat strip into fine portions.

4. The unit according to claim 1, wherein the bath of a dehydration-salting solution is a dehydrating brine bath at a temperature of less than 60° C., the bath of the pasteurization solution is a pasteurizing brine bath at a temperature of more than 60° C., and the dehydrating brine bath and the pasteurizing brine bath each have a pH of less than 7.

5. The unit according to claim 1 wherein the continuous conveyance device includes a plurality of rollers to drive movement of the single, continuous meat strip through the unit.

6. The unit according to claim 1 wherein the first portion of the conveyor system is submerged within the bath of the dehydration-salting solution.

7. The unit according to claim 1 wherein the second portion of the conveyor system is submerged within the bath of the pasteurization solution.

8. The unit according to claim 1 wherein the third portion of the conveyor system is submerged within the rinsing tank.

* * * * *